United States Patent Office 3,288,853
Patented Nov. 29, 1966

3,288,853
METHOD FOR THE PREPARATION OF DICYCLOHEXYL KETONE
Werner Muench, Barlassina, Francesco Siclari, Cesano Maderno, Giuliana Silvestri and Teresa Argenziano, Milan, and Roberto Iacuone, Cesano Maderno, Italy, assignors to Snia Viscosa Societá Nazionale Industria Applicazioni Viscosa S.p.A., Milan, Italy, an Italian company
No Drawing. Filed June 20, 1963, Ser. No. 289,432
4 Claims. (Cl. 260—586)

The applicants have described in their copending application Serial No. 284,816, filed June 3, 1963, a method for the preparation of cyclohexylphenyl ketone with substantially quantitative yields. Such a method is characterized by the fact that the catalyst used comprises metal oxides dissolved in a mixture of benzoic acid and hexahydrobenzoic acid. By this method there is obtained a particularly pure ketone in high yields if the metal used is exclusively or chiefly manganese.

Now, it has been found that, operating with said method, the hexahydrobenzoic acid can also be transformed into dicyclohexyl ketone with practically quantitative yields when the metal oxides used, as catalysts, in particular manganous oxide, are dissolved in the same hexahydrobenzoic acid.

The chief difference which distinguishes said method from all the methods proposed hitherto consists in the fact that the yield of dicyclohexyl ketone is substantially quantitatively calculated with regard to the hexahydrobenzoic acid subjected to the reaction, analoguously to what has been mentioned already for cyclohexylphenyl ketone.

Hexahydrobenzoic acid is an acid in which the COOH— group is bound to a secondary carbon atom. As appears from literature, the acids in which the COOH— group is bound to a secondary carbon atom, can be transformed, with more difficulty into ketones than the acids in which the COOH— group is bound to a primary carbon atom, while the yields are, in all cases, lower. In fact, all the experiments carried out hitherto for obtaining dicyclohexyl ketone through ketonization of the hexahydrobenzoic acid, led to unsatisfactory yields only. In fact for the preparation of dicyclohexyl ketone, there have been used hitherto extremely complicated methods, resorting for instance to Grignard's compounds or to mercury compounds.

The difficulties arising in the ketonization of hexahydrobenzoic acid become evident also from the fact that for the preparation of dicyclohexyl ketone at comparable reaction times, it is necessary to operate at temperatures substantially higher than those which are applied for the preparation of cyclohexylphenyl ketone. Whilst the preparation of the latter is performed at temperatures ranging between 300 and 400° C., preferably at about 350° C., for the preparation of dicyclohexyl ketones it is necessary to operate at temperatures between 330° C. and 450° C., preferably at 400° C.

To prepare cyclohexylphenyl ketone a mixture of benzoic acid and hexahydrobenzoic acid is used whilst for the preparation of dicyclohexyl ketones, of course, only hexahydrobenzoic acid is used both for the preparation of the catalyst and for the symmetrical ketone.

To carry out the reaction, it is possible to apply advantageously the same operating conditions and to use the same apparatus as have been disclosed for the preparation of cyclohexylphenyl ketone. Thus it is possible to protect the catalyst against any eventual oxidation by introducing small amounts of hydrogen. It is also possible to keep the catalyst particularly efficient and to obtain a very pure ketone through a long operation period by blowing steam into the molten mass forming the catalyst. As already described with reference to the cyclohexylphenyl ketone, besides manganese oxide, it is possible to use as catalyst also other metal oxides, especially when mixed with manganese oxide and to add such metal oxides to the catalyst which, at the reaction temperature, are inert or practically inert, but which are capable of forming salts with the acid, as for instance magnesium oxide.

This novel method allows of transforming hexahydrobenzoic acid into the corresponding symmetrical ketone by extremely simple methods and first of all with practically quantitative yields caluculated with regard to the transformed acid, and provides therefore the possibility of producing dicyclohexyl ketone even on a commercial scale.

Dicyclohexyl ketone may be used for various purposes. It may be more particularly transformed according to a very simple method into ε-caprolactam through nitrosation by means of nitrosyl sulfate.

Its preparation will be disclosed better with further details in the following examples which are obviously to be construed in a non-limiting manner.

EXAMPLE 1

(a) *Preparation of the catalyst*

In a flask provided with a stirrer, a thermometer, a reflux condenser and a tube for the inlet of gas, there are put 524 gr. of commercial carbonate of manganese containing water (manganese content: 42%=4 moles of manganese oxide) and 488 gr. of hexahydrobenzoic acid. The mixture is heated under reflux and stirring in a stream of hydrogen to 115 to 120° C. for 1 hour. Carbon dioxide and water are formed. The reflux condenser is replaced by a downward condenser, and to the reaction mixture, there are added, always while stirring, an additional 488 gr. of hexahydrobenzoic acid, the molar ratio between hexahydrobenzoic acid and manganese becoming thus equal to 1.9:1. The temperature is then raised to 360° C. within a period of 2 hours. During this operation, water distills off and $CO_2$ is evolved. A small amount (15 gr.) of hexahydrobenzoic acid is carried off by the distilled water. After said operation, the mass of catalyst remaining in the flask weighs 1,213 gr.

(b) *Preparation of the ketone*

The stream of hydrogen is interrupted and is replaced by a mixture of superheated steam and hexahydrobenzoic acid vapor, prepared independently by introducing superheated steam into a second flask containing a small amount of hexahydrobenzoic acid heated to its boiling point, and continuously replacing the hexahydrobenzoic acid evaporated by fresh acid introduced drop by drop in the flask.

Thus, during 48 hours, there are introduced 13,968 gr. of hexahydrobenzoic acid (about 291 gr. per hour) into the reaction mass, and there is obtained a distillate containing water, non-reacted acid, and the ketone, the organic layer of which weighs 11,400 gr. During the whole operation, the weight of catalyst has diminshed to 780 gr. In order to recover the non reacted hexahydrobenzoic acid, to the distillate, diluted with 500 cubic cm. of ether, there is repeatedly added while stirring a solution of 10% of sodium carbonate until the aqueous layer remains alkaline. The aqueous layer is separated and acidified with hydrochloric acid. The separated hexahydrobenzoic acid is filtered off and dried. Thus 2,360 gr. of hexahydrobenzoic acid are removed.

The ether layer is dried and the ether is distilled off. Subsequently the organic substance is distilled at 76/78° C. under 0.1 mm. of mercury, with a 1 m. high Vigreux column. There are obtained 8,790 gr. of pure ketone and a residue weighing 6 gr.

The catalyst remaining in the reactor is heated with an excess of hydrochloric acid until the manganese has completely dissolved as chloride and the aqueous layer is separated from the organic layer which is treated as described hereinabove for the reaction product. Thus there are obtained further 31 gr. of dicyclohexyl ketone, 705 gr. of hexahydrobenzoic acid and 40 gr. of residue.

Taking into account the total amount of 14,944 gr. of hexahydrobenzoic acid introduced into the process, which quantity includes also the amount of 976 gr. which has been used for preparing the catalyst, and the amount of 3,065 gr. of hexahydrobenzoic acid recovered, in which quantity are included 705 gr. of the acid recovered from the catalyst, there is obtained a total yield of 8,830 gr. of dicyclohexyl ketone corresponding to 98.1% of the theoretical yield.

The conversion is calculated on the amount of 8,790 gr. of dicyclohexyl ketone and the amount of non-transformed acid present in the distillate at the moment at which the experiment is interrupted.

The amount of ketone present in the distillate corresponds to 11,608 gr. or acid, whereas the distillate contains 2,360 gr. of non-transformed acid. Thus the conversion is at a rate of 83.1%.

The method described is particularly suitable when operating with a non-purified hexahydrobenzoic acid, the purification of which is obtained by steam distillation and is executed during the process.

Instead of introducing steam into the molten acid and bringing the vaporous mixture into contact with the catalyst it is also possible—if pure hexahydrobenzoic acid is available—to introduce the steam directly into the mass of the catalyst and to add the acid separately to the reaction mass.

When operating with an apparatus thus modified, the same yield and the same rate of conversion are obtained.

EXAMPLE 2

(a) *Preparation of the catalyst*

For the preparation of the catalyst the same apparatus is used as that described in Example 1. Into a flask there are put 524 gr. of carbonate of manganese containing water (42% of manganese metal=4 moles), 80.6 gr. of magnesium oxide (2 moles) and 732 gr. of hexahydrobenzoic acid. The mixture is heated for 1 hour under reflux and while stirring in a stream of hydrogen at a temperature of 120° C. 732 gr. of hexahydrobenzoic acid are added (molar ratio between acid and metal=1.9:1). The reflux condenser is replaced by a downward condenser and the mixture is heated while stirring slowly up to 370° C. in the course of 2 hours. During that time water distills and $CO_2$ is evolved. The distilled water carries off a small amount (37 gr.) of hexahydrobenzoic acid.

At this moment, the mass of catalyst weighs 1,703 gr.

(b) *Preparation of the ketone*

Now the stream of hydrogen is replaced by a stream of superheated steam which is introduced continuously into the molten mass of catalyst heated while stirring to 390/395° C. Simultaneously, there is added dropwise to the catalyst hexahydrobenzoic acid in such amount that when the process is stopped after 14 hours, there have been introduced a total of 5,100 gr. of acid.

4,580 gr. of an organic substance are obtained which, when treated as disclosed in Example 1, proves to be a mixture of 730 gr. of water, 1,400 gr. of pure hexahydrobenzoic acid, 3,150 gr. of dicyclohexyl ketone, and 15 gr. of a high boiling product.

From the mass of the catalyst treated in the manner described in Example 1, the weight of which during the reaction has diminished to 1,190 gr. there are obtained an additional 52 gr. of dicyclohexyl ketone and 745 gr. of hexahydrobenzoic acid. The yield and the rate of conversion are calculated in the same manner as in Example 1. Taking into account the total amount of 6,564 of hexahydrobenzoic acid applied and the total amount of 2,182 gr. of hexahydrobenzoic acid recovered, the yield is equal to 96.4% of the theoretical yield and the conversion rate is equal to 75% of the theoretical rate calculated on the transformed hexahydrobenzoic acid.

We claim:

1. The method for producing dicyclohexyl ketone from hexahydrobenzoic acid, which consists of first dissolving manganous oxide in hexahydrobenzoic acid to provide a liquid catalytic compound, then feeding a further amount of hexahydrobenzoic acid into said catalytic compound, while maintaining the further amount of acid and said catalytic compound between 330° and 450° to produce the said ketone from said acid, and then removing the ketone produced.

2. The method of claim 1, wherein the said catalytic compound is prepared by causing hexahydrobenzoic acid to dissolve the manganous oxide in a molar ratio between acid and metal of about 1.9:1.

3. A method for the preparation of dicyclohexyl ketone, consisting in preparing a catalyst consisting of manganous oxide dissolved in hexahydrobenzoic acid, then heating additional hexahydrobenzoic acid to a temperature ranging between 330 and 450° C. in the presence of said catalyst and of a stream of stream, and removing the dicyclohexyl ketone formed.

4. A method for the preparation of dicyclohexyl ketone consisting in preparing a catalyst consisting of a major amount of manganous oxide and of a minor amount of magnesium oxide dissolved together in hexahydrobenzoic acid, then heating additional hexahydrobenzoic acid to a temperature ranging between 330 and 450° C. in the presence of said catalyst, and removing the dicyclohexyl ketone formed.

References Cited by the Examiner

UNITED STATES PATENTS

| | | | |
|---|---|---|---|
| 1,315,525 | 9/1919 | Morton | 260—595 |
| 1,385,866 | 7/1921 | Drewsen | 260—595 |
| 1,988,021 | 1/1935 | Schmidt | 260—595 X |
| 2,697,729 | 12/1954 | Ohlson et al. | 260—586 |
| 3,043,852 | 7/1962 | Mills | 260—595 X |

OTHER REFERENCES

Sabatier: "La Catalyse en Chimie Organique," pp. 331–4 (1920).

LEON ZITVER, *Primary Examiner.*

LORRAINE A. WEINBERGER, *Examiner.*

M. JACOB, *Assistant Examiner.*